(12) United States Patent
Gladstone

(10) Patent No.: US 7,389,263 B2
(45) Date of Patent: Jun. 17, 2008

(54) METHOD AND SYSTEM FOR THE AUTOMATED TRADING OF FINANCIAL INSTRUMENTS

(76) Inventor: Garry D Gladstone, 930 Tahoe Blvd., Incline Village, NV (US) 89451

( * ) Notice: Subject to any disclaimer, the term of this patent is extended or adjusted under 35 U.S.C. 154(b) by 333 days.

(21) Appl. No.: 09/884,303

(22) Filed: Jun. 19, 2001

(65) Prior Publication Data

US 2002/0004776 A1 Jan. 10, 2002

Related U.S. Application Data

(60) Provisional application No. 60/222,558, filed on Aug. 3, 2000, provisional application No. 60/216,812, filed on Jul. 7, 2000.

(51) Int. Cl.
*G06Q 40/00* (2006.01)
(52) U.S. Cl. .................... 705/37; 705/35; 705/36 R
(58) Field of Classification Search .................. 708/37; 705/26, 35–45, 1; 709/228, 237; 726/1–21
See application file for complete search history.

(56) References Cited

U.S. PATENT DOCUMENTS

| | | | | |
|---|---|---|---|---|
| 5,270,922 A | * | 12/1993 | Higgins | 705/37 |
| 5,454,104 A | * | 9/1995 | Steidlmayer et al. | 707/4 |
| 6,029,146 A | * | 2/2000 | Hawkins et al. | 705/35 |
| 6,285,521 B1 | * | 8/2001 | Howorka | 705/37 |
| 6,304,858 B1 | * | 10/2001 | Mosler et al. | 705/37 |
| 6,321,212 B1 | * | 11/2001 | Lange | 705/37 |
| 6,477,647 B1 | * | 11/2002 | Venkatraman et al. | 713/193 |
| 6,505,174 B1 | * | 1/2003 | Keiser et al. | 705/36 R |
| 6,601,044 B1 | * | 7/2003 | Wallman | 705/36 |
| 6,615,188 B1 | * | 9/2003 | Breen et al. | 705/37 |
| 7,020,632 B1 | * | 3/2006 | Kohls et al. | 705/37 |
| 2007/0208645 A1 | * | 9/2007 | Hoffman et al. | 705/36 R |

OTHER PUBLICATIONS

Bednarz, Ann, "Tool Processes Finance Data on the Fly" Netwrok World, v22n25, p. 29-30, Jun. 27, 2005.*

* cited by examiner

*Primary Examiner*—Mary Cheung
*Assistant Examiner*—Kirsten S Apple
(74) *Attorney, Agent, or Firm*—Stetina Brunda Garred & Brucker

(57) ABSTRACT

In accordance with the present invention, there is provided a method of communicating trade orders in a marketplace for financial instruments through an on-line trading account with a financial institution. The method includes receiving trade trigger criteria and market data for use by market analysis software. The method further includes accessing the market analysis software to generate a trade decision using the trade trigger criteria and the market data. The method further includes automatically communicating a trade order, based upon the trade decision, to the marketplace via the on-line trading account.

26 Claims, 1 Drawing Sheet

METHOD AND SYSTEM FOR THE AUTOMATED TRADING OF FINANCIAL INSTRUMENTS

CROSS-REFERENCE TO RELATED APPLICATIONS

The present application is related to provisional patent applications entitled "APPARATUS AND METHODS FOR AUTOMATIC ON-LINE ORDER ENTRY AND EXECUTION REPORT INTERFACE FOR ELECTRONIC TRADING OF FINANCIAL INSTRUMENTS", Ser. No. 60/216,812, filed on Jul. 7, 2000, and entitled "APPARATUS AND METHODS FOR AUTOMATIC ON-LINE ORDER ENTRY FOR ELECTRONIC TRADING OF FINANCIAL INSTRUMENTS", Ser. No. 60/222,558 filed on Aug. 3, 2000, which are incorporated herein by reference.

STATEMENT RE: FEDERALLY SPONSORED RESEARCH/DEVELOPMENT

Not Applicable

BACKGROUND OF THE INVENTION

The present invention relates generally to the trading of financial instruments, and more particularly to a method and system for automatically communicating trade orders for financial instruments through an on-line trading account with a financial institution.

Over recent years, two particular topics have been the focus of substantial attention. One of these topics is the trading of various types of financial instruments, such as securities, stocks, bonds, currencies, options, futures and derivatives thereof. As used herein the terms trade and/or trading generally refers to transactions such as buying and/or selling. The successful trading of such financial instruments often involves the research, development and historical testing of a system or methodology ("Trading Plan"). Such a Trading Plan is used by a trader for exploiting anticipated price change opportunities, and also for controlling risk because prices often move contrary to the direction anticipated by the trader. Thus, the trader's function is to attempt to develop a Trading Plan which strikes a fine balance between profit seeking and risk control, for creating risk-adjusted profits in excess of the return on market indexes. Once the trader has developed an objective Trading Plan, the actual execution of the Plan requires market price monitoring and responsive order entry/cancellation activity. It is known that even brief lapses in trader attentiveness and immediate reaction to market changes will often result in violation of the Trading Plan, and thereby upset the Trading Plan's fine balance between profit seeking and risk control. In this regard, active traders often have limited opportunities to invest their time in other important activities, such as research.

The other topic of attention is the rapid growth of the global computer network (i.e., the Internet) and the increasing level of influence it is having on virtually every facet of everyday life. A cursory scan of television programming, magazines or newspapers on almost any given day demonstrates how the Internet is becoming a tool of steadily increasing importance for both business and personal activities. This has included using the Internet to facilitate the trading of financial instruments on-line.

In this regard, the financial institutions, including brokerages, which make up and/or provide access to the various financial instruments marketplaces, have implemented "on-line" services which allow customers to engage in trading over data communications networks, including the Internet. As a result, nearly any investor having access to the Internet may more directly engage in trading activity without being forced to speak to a broker to enter their orders in the marketplace for execution.

While that development has significantly reduced order entry labor for the on-line brokerages, their trader/customers' order entry labor burden remains largely unchanged, merely converted from dialing the telephone to tapping the computer keyboard keys and clicking the mouse. Therefore, those who are not ready, willing or able to make themselves constantly available to monitor the markets and immediately manually enter their orders in response to changes in market conditions, are still precluded from the benefits to be derived from the consistent and disciplined conformance with an objective Trading Plan.

It is therefore evident that there exists a need in the art for a more efficient method and system for trade order entry in comparison to the prior art.

BRIEF SUMMARY OF THE INVENTION

In accordance with an embodiment of the present invention, there is provided an automated method of communicating trade orders to a marketplace for financial instruments through an on-line trading account with a financial institution. It is contemplated that the financial institution may offer trading services via a computer network, such as the Internet. In this regard, the on-line trading account may be hosted at a web address (i.e., a particular web site or Uniform Resource Locator (URL)) accessible through the Internet.

The method includes receiving trade trigger criteria for use by market analysis software. The market analysis software is configured to electrically receive market data. Such market data may be real-time or near real-time data representative of conditions in the marketplace. The method further includes accessing the market analysis software to generate a trade decision using the trade trigger criteria and the market data. The method further includes automatically communicating a trade order, based upon the trade decision, to the marketplace via the on-line trading account for execution.

The market analysis software may be hosted at a web address accessible through a computer network. However, it is contemplated that the market analysis software may be hosted by an entity different than the financial institution associated with the on-line trading account. In another embodiment, the market analysis software may be hosted at a personal computer. Further, the trade trigger criteria may also be based upon a status of the on-line trading account.

It is contemplated that a given business entity may offer services in the form of facilitating the aforementioned method steps. Such entity may be different than both the financial institution and the provider of the market analysis software. Such services may be facilitated through the use of a web address, for example. In this regard, a user of such services may be a professional, semi-professional or non-professional acting on behalf of himself/herself and/or others. Such a user is contemplated to have initially established the on-line trading account with a financial institution. In practicing an embodiment of the present invention, the user would then access the web address and input the trade trigger criteria and information concerning the user's on-line trading account. The system at the web address would then receive the inputted trade trigger criteria. In turn, the system would then access the market analysis software and use the trade trigger criteria as an input thereto. Next, the market analysis software is contemplated to respond, to those changes in market data which cause the trade trigger criteria to be met, by outputting a trade decision. This trade decision is received by the system and a corresponding trade order is then automatically communicated through the Internet to the marketplace for execution through the on-line trading account. Thus, the user is advantageously spared having to be constantly available to manually make the keystrokes and/or mouse clicks, heretofore required to enter the trade orders.

In another embodiment of the present invention, there is provided an automated system which may be utilized for effecting the above described method for communicating trade orders for financial instruments through an on-line trading account with a financial institution. The system includes a user interface which is configured to receive trade trigger criteria from a user. The system further includes market analysis software which is in electrical communication with the user interface for receiving the trade trigger criteria therefrom. In this regard, the system may include a market analysis software interface which is in electrical communication with the market analysis software. The market analysis software is configured to receive market data. The market analysis software is further configured to generate a trade decision in response to the trade trigger criteria being met by changes in the market data. The system further includes a trading account interface which is in electrical communication with the market analysis software for receiving the trade decision therefrom. The trading account interface is configured to automatically communicate a trade order, based upon the trade decision, to the marketplace via the on-line trading account.

It is contemplated that the system configuration is flexible in nature. For example, the trading account, the user interface, the market analysis software interface, the market analysis software and the trading account interface may each be physically located at different locations and maintained by different entities, with or without cooperation. For example, the system may be maintained by one entity with the system being configured to selectively access, via the Internet, a plurality of market analysis software programs maintained by various providers. Alternatively, the market analysis software may be hosted at the same location that the user interface is located which may be a web address or even on a personal computer of the user/trader. In yet another configuration, the system may be configured to selectively access user trading accounts maintained with a plurality of various financial institutions. Such configuration flexibility is contemplated to allow for common usage by a diverse user/client base.

As such, based on the foregoing, the present invention mitigates the inefficiencies and limitations associated with prior art methods and systems for facilitating trading order entry activity. The present invention provides the user with efficiencies on many different levels due to its automated nature. First, unlike the typical computerized prior art systems, the user/trader is not required to physically enter a trade order by manually making keystrokes and/or computer mouse clicks to effect the desired trade. Second, the system is configured to automatically convert the trade decision to a trade order and immediately transmit it to the marketplace for execution. This avoids time delays between the trade decision and the trade execution which may be caused by lapses in trader attention. Avoidance of such delays which occur under the prior art when the trader is not immediately available to transmit the triggered trade order, mitigates against undesirable results due to adverse market price changes which may occur during such delays. Further, by automating the entry of the trade orders, the present invention provides a fail-safe substitute for the trader self-discipline necessary under the prior art for executing trading decisions in accordance with the user/trader's own predefined trading plan. It is noted, however, that the system may still be configured to allow for user intervention.

Another advantage of the system of the present invention is that it is highly customizable so as to compliment existing products and systems offered in the marketplace. This is contemplated to appeal to a broad user or client base. It is contemplated that the typical user would have an existing trading account with a given financial institution. The system could be configured to interface with many different financial institutions thereby appealing to many different potential users. Similarly, it is contemplated that the system could be configured to interface with many different market analysis software programs available in the marketplace, as users may have particular preferences in this regard as well.

Another advantage of the present invention lies in the system configuration wherein the system is operated by an entity different than the financial institution executing the trade order. In this way, the data concerning the user's intended trades and trading plan, in the form of the user's trade trigger criteria, trade decisions and trading orders are kept segregated from such financial institution until actual execution thereof. The likely result of this segregation is order execution at more favorable prices than would otherwise be available for the reasons described below.

In many cases the potential trading decisions based upon the Trading Plan can be anticipated in advance while the execution of these decisions remains contingent upon price changes in market data sufficient to meet the trade trigger criteria. This foreknowledge may allow for the use of orders which are intended to be held by the exchanges' "market maker" (known as the "specialist" such as LaBranche (symbol:LAB), or "order filling floor broker" on open outcry exchanges such as the Chicago Mercantile Exchange), or other market maker such as Knight (symbol:NITE) for non-exchange trades (such as NASDAQ), for execution if and when the specified price level is achieved. These orders are known as "limit" and "stop" orders.

Though limit and stop orders provide a measure of convenience, there is an inherent conflict associated with using them. Market makers earn their income, not from agency commissions, but rather by trading against customers' orders at a profit. For example, the customer wants to buy in the belief that the price will rise. The market maker must sell to the customer, and can only profit by buying at a lower price than the sale price to the customer. In the example of a momentum trader, using a stop order to buy if the security trades up to a certain price, the market maker is incentivized to buy in anticipation of and/or to bid up the price to actually activate the buy stop order. This practice is referred to as "front running." Once activated the market maker then sells the security to the customer at the offer price, most often somewhat above the specified activation price, with the natural focus on the market maker's profit rather than the best price for the customer.

In the case of a limit order, especially when many limit orders accumulate at or near the same level, the situation is even worse for the customer. In this example, the limit order specifies a purchase price below the current price level and is placed on the belief that the price will come down to this level of previous support where the declining price met with strong buying and turned and rose in the past. The market maker, with this knowledge based upon actually seeing the orders, gets to make risk-free trades for its own account. To accomplish this, the market maker simply bids the price of its customer's limit order for its own account. If the market maker is able to buy at the bid price, and if the market then rises (or the market maker can resell at the offer price), then a profit is made by the market maker while the customer order remains unfilled and the customer misses the profitable trade. If, instead of rising the price were to decline, to avoid any loss, the market maker may simply sell the position to the customer at the limit order price for a breakeven trade. The customer is now in a loss position from the first moment, because the market price had already fallen below the limit order price at the time the market maker sold its position to the customer to fill the limit order. The information betrayed by the flow of customer orders is so valuable to the market makers, that market makers actually pay the brokerages to direct their customers' orders to them. This practice is known in the industry as "payment for order flow".

The present invention tends to avoid or mitigate against the situation where the market maker's knowledge of a trader's stop and limit orders tends to work against the best execution price for the trader, by means of withholding all such orders until the moment that the trade trigger criteria has been met.

Accordingly, the present invention represents a significant advance in the art.

BRIEF DESCRIPTION OF THE DRAWING

These, as well as other features of the present invention, will become more apparent upon reference to the drawings wherein.

DETAILED DESCRIPTION OF THE INVENTION

Figure 1:
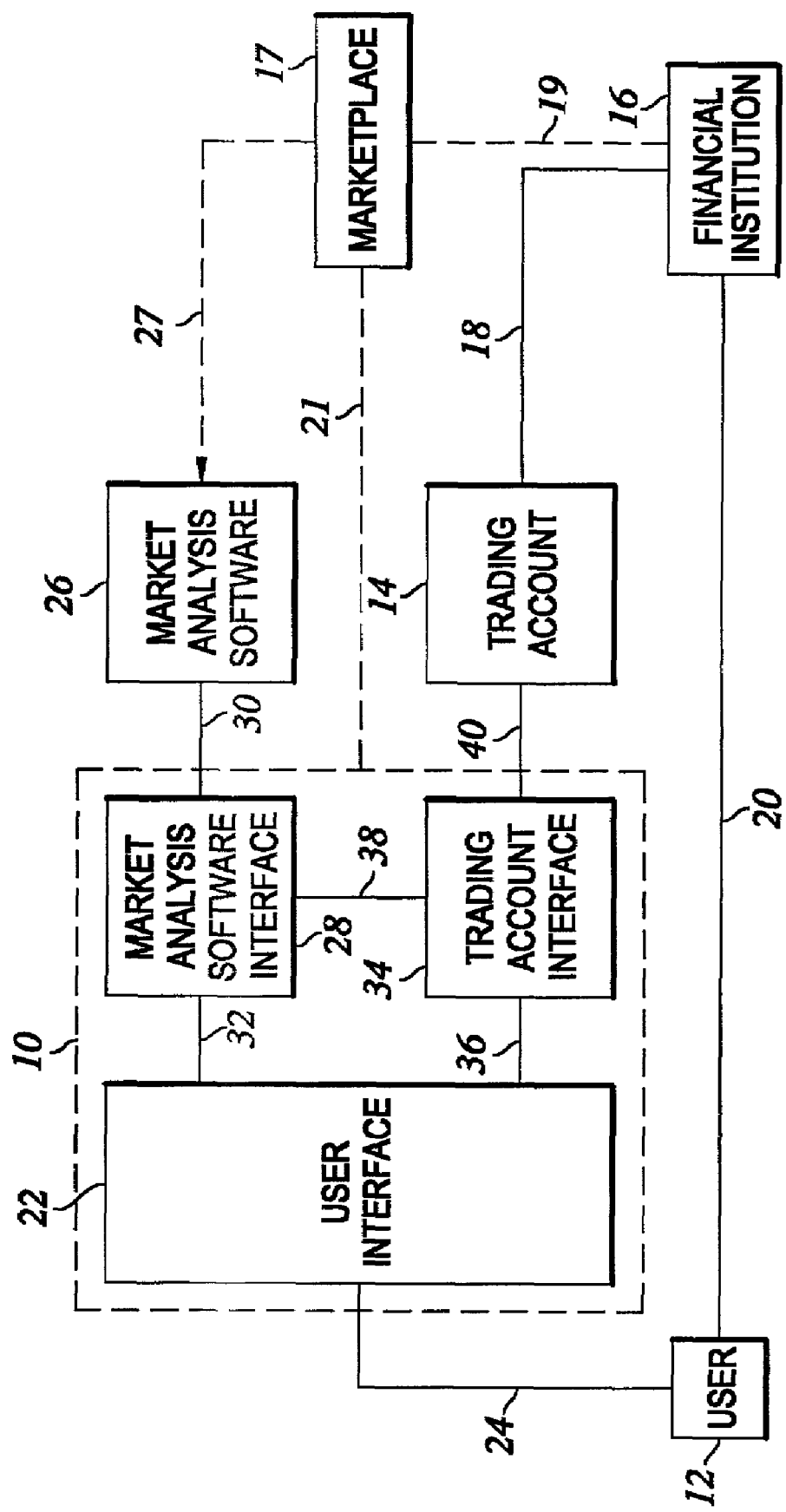
FIG. 1 is a symbolic diagram illustrating a system for implementing the method of the present invention.

Referring now to the drawings wherein the showings are for purposes of illustrating a preferred embodiment of the present invention only, and not for purposes of limiting the same, FIG. 1 illustrates a preferred system for implementing the method and system 10 for automatically communicating financial instrument trade orders of the present invention.

In an embodiment of the present invention, there is provided an automated system 10 for communicating trade orders to a marketplace 17 for financial instruments through a trading account 14 with a financial institution 16, such as a brokerage house or any other entity providing access to financial instruments trading. In this regard, it is contemplated that a user 12 has established some relationship with the financial institution 16 to initially set-up the trading account 14. The trading account 14 allows trading orders to be communicated electronically (referred to herein as an "on-line" trading account 14). Thus, relational link 18 is representative of the affiliation between the user 12 and the financial institution 16. Similarly, relational link 18 is symbolic of the maintenance of the on-line trading account 14 by the financial institution 16. The on-line trading account 14 may be accessible through a computer network. In the case where the computer network is the Internet, the on-line trading account may be hosted at a web address. While the computer network may be what is currently understood as the Internet, any other computer communication and/or network arrangements may also be utilized, such as local area networks (LANs), intranets, extranets, wide area networks (WANs), private networks, virtual private networks, dedicated circuits, integrated services digital networks (ISDNs), frame relay, whether utilizing wire, fiber, satellite, electrical, optical, wireless, infared, radio frequency or any other form of electromagnetic wave-based mediums.

Further, it is contemplated that such financial institution 16 has a predefined relationship with the marketplace 17 for facilitation of communication or placement of trade orders therewith as symbolically depicted as symbolic relational link 19.

The system 10 includes an user interface 22 which the user 12 may access. In this regard, depicted relational link 24 is symbolic of such access and interaction therewith between the user 12 and the system 10, and in particular the user interface 22. It is contemplated that the user 12 may access the user interface 22 via any of those methods which are well known to one of ordinary skill in the art and may include telephony based systems, cable (Digital Subscriber Lines (DSL) and variations thereof, wire, optical, etc.), optical communications (including infrared), and wireless forms of communications, such as those based upon cellular, satellite, radio frequency (RF) and other forms of electromagnetic wave based mediums.

As such, the user interface 22 may be accessible through the Internet with the user interface 22 being hosted at a web address. Alternatively, the user interface 22 may be hosted at a personal computer of the user 12. As used herein, the terms computer and/or personal computer includes any of those computing devices which are well known to one of ordinary skill in the art, including any device used to automatically apply logic. For example, such computing devices may include computers of all kinds such as servers, desktop computers, laptop computers, terminals, hand-held palm devices, etc.

The user interface 22 may be configured to receive trade trigger criteria, as further described below, from a user 12. The system 10 may be further provided with a market analysis software interface 28 which is disposed in electrical communication via a communications link 32 with the user interface 22 for receiving the trade trigger criteria therefrom. As used herein, the terms electrical communication and electronic communication refer to data communications utilizing any electromagnetic wave based medium. In turn the market analysis software interface 28 is configured to communicate the trade trigger criteria to market analysis software 26 via a communications link 30. It is contemplated that the communications links 30 and 32 are symbolically representative of the flow of information thereacross. Moreover, it is contemplated that the trade trigger criteria may be based upon a status of the trading account 14. As such the market analysis software 26 may access information from the trading account via the communications link 40 from the system 10.

The market analysis software 26 is also referred to in the industry as market timing software and technical analysis software. Some examples of commercially available market analysis software 26 include, Tradestation by Omega Research, Inc. (symbol:OMGA) of Miami, Fla.; MetaStock by Equis International (a Reuters company) of Salt Lake City, Utah; and Trading Expert Pro by AIQ Systems (a division of Track Data Corp., symbol: TRAC) of Incline Village, Nev. The trading decision algorithms incorporated in the market analysis software 26 may vary greatly.

The market analysis sofrware 26 is configured to receive and utilize market data 27. Preferably such market data 27 is close to real-time as possible. The utilization of price changes, trading volume and derivative algorithms thereof to make trading decisions, begins with the collection of market price, trading volume and/or other items of recorded market data 27. Those market data 27 are recorded by the various marketplaces where financial instruments trades are executed. For example, marketplaces 17 as used herein can be exchanges, market makers or electronic communications networks (ECN's). Contemporary examples of exchanges are the New York Stock Exchange, the American Stock Exchange and the Chicago Mercantile Exchange. Examples of market makers are the National Association of Securities Dealers members (licensed securities firms with the authority to make various off-exchange trades, including block trades and trades on the NASDAQ (a network of member market makers firms)) such as Knight Trading Group, Inc. (symbol: NITE) and Mayer & Schweitzer, Inc. (subsidiary of Charles Schwab & Company, Inc.). Examples of Electronic Communication Networks include Archipelago, Island, Redibook, and Attain which are SEC sanctioned networks that seek to match traders orders directly. It is contemplated that trades are recorded by the various marketplaces and that market data 27 is sold or licensed to various market data wholesales (referred to as "data resellers") which then resell and electrically transit such market data 27, preferably as close to real-time as recorded, to various interested parties. A few examples of such data resellers are S & P Comstock by Standard and Poors Corporation of Harrison, New York, and eSignal by Data Broadcasting Corporations of Hayward, California. Moreover, it is contemplated that the marketplace 17 and financial institution 16 may be one in the same.

In general the market analysis software 26 allows the trader to select, set and utilize a variety trade entry and exit criteria or triggers which may be based on price, volume, or derivations thereof (referred to as technical analysis tools or indicators). Thus, such tools or indicators are based upon the various values of the market data 27. The particular combinations and/or values of such trade entry and exit criteria are referred to herein as trade trigger criteria which is received from the user 12, preferably although not required, through the user interface 22. A few examples of such trade entry and exit criteria include, but are not limited to, volume, new highs or new lows (for periods from 1 minute to 52 weeks to current lifetime of the subject financial instrument), breakouts from corrective or consolidative patterns, support and resistance levels, trendlines, moving averages, standard deviation, volatility, rate of change, relative strength, alpha, beta, tick, arms index ("TRIN"), average directional movement, and various oscillators including, moving average convergence divergence, stochastics, relative strength index, on balance volume and accumulation/distribution. Additionally, as mentioned above, the trade trigger criteria may be based upon a status of the trading account 14. As such, account equity, trade positions, order status, and/or the prices at which the user 12 actually previously purchased or sold a given financial instrument (as opposed to previous trade decisions and orders) may be taken into account by the market analysis software 26.

Importantly, the market analysis software 26 is configured to generate a trade decision in response to the trade trigger criteria being met by changes in the market data 27 as representative of conditions in the marketplace 17 and/or the trading account 14. The market analysis software interface 28 is configured to receive a trade decision from the market analysis software 26.

The system 10 further includes a trading account interface 34 which is in electrical communication with the market analysis software interface 28 for receiving the trade decision therefrom. In this regard, communications link 38 is representative of the flow of information thereacross. The trading account interface 34 is configured to automatically communicate a trade order based upon the trade decision to the marketplace 17 via the on-line account 14. Preferably, this is effected by the financial institution 16 via the relational link 19. Communications link 40 is representative of the flow of information from the system 10 to the trading account 14 for proper accounting of the placed trade order. In another arrangement, it is contemplated that the system 10 may be configured to more directly communicate trade order to the marketplace 17 as depicted via symbolic relational link 21. Nonetheless, the system 10 is still contemplated to communicate with the trading account 14 for proper accounting of the placed trade order.

It is contemplated that the system 10 is flexible in nature. In this regard, as used herein the system 10 may vary depending upon the configuration used and the entity providing or hosting the same. For example, in one embodiment the system 10 may include the user interface 22, the market analysis software interface 28 and the trading account interface 34 all hosted at a web address. In this regard, such software may be configured to access market analysis software 26 maintained by some third party, as well as the trading account 14 maintained by the financial institution 16. It is contemplated that the system 10 may be configured to be compatible with a plurality of different trading accounts maintained by a plurality of different financial institutions as well as a plurality of different market analysis software 26 provided by a plurality of different providers. It is contemplated that such a configuration may be with or even without the cooperation of such financial institutions and third party providers. For example, the trading account interface 34 may take the form of software which is configured to simulate electrical signals necessary to access the user's on-line trading account 14 representative of the user 12 manually logging-on to his/her trading account 14 (e.g., key strokes and/or mouse clicks).

With regard to the market analysis software 26 which may be maintained by some third party accessible via the Internet, the market analysis software interface 28 may be configured to monitor data files and electrical signals of the market analysis software 26 to receive trade decisions therefrom utilizing those techniques which are well known to one of ordinary skill in the art which may include for example, periodically polling output data files, use of a "hook" process in order to intercept events and messages internal to the software, as well as direct communications with the provider of the software. Moreover, the system 10 and components thereof may be distributed in nature with portions of software being loaded upon a personal computer of the user 12 as well as hosted on a server accessible via the Internet.

Alternatively, where the market analysis software 26 is hosted by the same provider as the system 10, the communications link 30 may simply take the form of an internal data flow within a software program. Thus, it is understood that the degree of complexity of the user interface 22, market analysis software interface 28, the market analysis software 26, the trading account interface 34, the trading account 14 and all of the various communications links associated therewith 18, 19, 20, 21, 30, 32, 36, 38, 40, depends upon the particular system configuration utilized, the construction of which is contemplated to be chosen from those methods which are well known to one of ordinary skill in the art. As such, it is contemplated that data may be electrically communicated between and through such various components and links, internally and externally, utilizing technology based upon telephony based systems, cable, Digital Subscriber Lines (DSL) and variations thereof (wire, optical, etc.), optical communications (including infrared), and wireless forms of communications, such as those based upon cellular, satellite, radio frequency (RF) and other forms of electromagnetic wave based mediums.

The present invention further includes a method of communicating trade orders. The method includes receiving the trade trigger criteria for use by the market analysis software 26. While the trader trigger criteria is preferably communicated by the user 12 electrically, such as via the user interface 22, it is contemplated that the user 12 may simply manually write out the trade trigger criteria to be inputted in to the system. At some point, however, the trader trigger criteria is processed and therefore may be received via a computer for forwarding to the market analysis software 26. The method further includes accessing the market analysis software 26 to generate the trade decision using the trade trigger criteria and the market data 27. The method further includes automatically communicating a trade order based upon the trade decision to the marketplace 17 via the on-line trading account 14.

From the perspective of the investor, trader or user 12, the method may include the initial steps of establishing the trading account 14 with a financial institution 16, wherein the financial institution 16 agrees to facilitate the purchase and sale of financial instruments on behalf the user 12. Next, it is contemplated that the user would input, through the use of a computer, the trade trigger criteria.

In order to more fully understand the advantages of the present invention, the following is an example of how a user 12 may utilize the same. The user 12 is on vacation deep in the wilderness and the marketplace 17 of interest is open. As of yesterday, the 20 day high of a particular financial instrument, XYZ, is $100. This morning XYZ opens at $95 ⅛, then trades higher, and now trades up to $100 $1/16$ for the first time in more than 20 days. This is a buy signal according to the trader's Trading Plan. The trader's account equity is $100,000. On hundredth of that is $1,000 which is the amount the user 12 has chosen to risk on each trade. The low today is $95 ⅛. Therefore, the fail safe exit price according to the Trading Plan is $95 $1/16$. The difference between the entry price of $100 $1/16$, and the fail safe exit price of $95 $1/16$, equals a risk of $5 per share. The risk per trade of $1,000 divided by the risk per share of $5, equals 200 shares which is the correct quantity per the Trading Plan. The market analysis software 26 may be configured to calculate all of this. Based upon inputted trade trigger criteria and market data 27 a trade decision may be generated by the market analysis software 26 indicating an immediate buy of 200 shares of XYZ at the current market price. Electrical Signals indicating such a trade decision are passed to the trading account interface 34. The trading account interface 34 automatically communicates a trade order based upon the trade decision for execution in the marketplace 17. The on-line account 14 of the user 12 maintained with the user's broker/financial institution 16 is informed of the executed trade order. This is all accomplished without the need for the trader's attention or intervention. If a buy stop order were used instead of the system 10 or methods according to the present invention, in order to achieve a similar result, the user 12 would still have to monitor and/or manually replace the buy stop order every day, because the criteria, "the highest high of the most recent twenty days" will indicate a new and different price as often as every day.

After the trade order has been executed in the marketplace 17, a report that the user 12 has bought 200 shares of XYZ at $100 $1/16$ is transmitted through the on-line account 14 to the market analysis software 26. With this new input, the market analysis software 26 may now calculate an exit trigger. The initial fail-safe exit trigger is a trade below the entry day low of $95 ⅛, which would be $95 $1/16$. (This price is higher than the lowest of both the most recent ten and twenty day periods, and therefore is the correct price according to the Trading Plan.) The partial profit target for 50% of the shares is two times the initial risk per share, in this case it is two times the $5 risked per share (as calculated above) which equals a $10 per share profit target. That $10 is added to the entry price for a profit target price of 110 $1/16$ on 50% of the position, which is 100 of the 200 shares. XYZ closes on its high of the entry date at $105.

The next day XYZ opens at $105 and trades higher to the partial profit price of $100 $1/16$. The market analysis software 26 now indicates a trade decision of an immediate sale of 100 shares of XYZ at the current market price. The trading account interface 34 automatically communicates an electrical signal representing a trade order based upon the trade decision for execution in the marketplace 17. The on-line account 14 of the user 12 maintained with the user's broker/financial institution 16 is informed of the executed trade order. This is all accomplished without the need for the trader's attention or intervention.

If a limit order were used instead of the invention, the trader's order in the marketplace would be new information known by competing traders, the effect of which would tend to cause other traders to enter competing order to sell at prices just below the trader's limit order selling price, thereby tending to cause the share price to stay below the trader's profit target. Orders placed in the marketplace always provide new information to competing participants, the effect of which is that the trader's own orders placed in the market, especially those placed well in advance of the actual time of their execution, tend to have a negative effect on the profitability of the trader's trading. The famous billionaire hedge fund trader, George Soros, has referred to this phenomenon as "reflexivity".

The report that the user 12 has sold 100 shares of XYZ at $110 $1/16$ in the marketplace 17 is then electrically transmitted through the financial institution 16 via the on-line account 14 back through the trading account interface 34, and to the market analysis software 26. With this new input, the market analysis software 26 now indicates the immediate cancellation of the failsafe trigger at 95 $1/16$ for the 100 shares that have just been sold. Under the prior art where human intervention was required, the fail-safe sell would have been placed as a "stop" order at $95 $1/16$ and would have needed to be canceled with the broker by the trader. In the event that XYZ quickly declined to the $95 $1/16$ trigger price before the trader was available to cancel the now duplicative 100 share portion of the original 200 share fail-safe order, then the trader's position would have inadvertently become "short" 100 shares of XYZ, as only 100 shares remained from the original purchase, yet 200 shares, not 100 as intended, were sold, contrary to the zero share position contemplated and intended by the Trading Plan.

Now the Trading Plan calls for the remaining 100 shares of XYZ to be liquidated when its ask price declines below the higher of the entry day low or the lowest low in the most recent twenty days. The lowest low in the most recent twenty days can change as often as every day if XYZ is in a steady up-trend. In that situation, the prior art would require that the trader enter the appropriate sell stop exit order and cancel the prior days sell stop order each day before the marketplace 17 opens. Lapses in this level of attentiveness would violate the trader's Trading Plan and likely upset the fine balance between profit seeking and risk control that the trader needs to create the risk-adjusted profits in excess of the returns on market indexes, which are usually the general object of active trading. Using the invention, as the price data feed is processed by the market analysis software 26, the exit price triggers are automatically updated and exit orders consistent with the Trading Plan are transmitted from the market analysis software 26 through the on-line account 14 for execution at the desired time and price, automatically without any intervention on the part of the user 12.

After a few months of trending higher and after hitting a high of $225 per share, XYZ begins to appear to falter and trade sideways for several days before finally declining below the lowest low in the most recent twenty days which was $200 ⅛. The market analysis software 26 indicates a trade decision to sell 100 shares at the market price. This is converted into an electrical signal which is passed through the trading account interface 34 through the on-line trading account 14 to the financial institution 16 for execution in the marketplace 17, all without the need for trader attention of intervention. The trade order is executed in the marketplace 17 and confirmation that the remaining 100 shares of XYZ were sold at $200 ⅙ is electrically transmitted through the financial institution 16 via the on-line account 14 back to the trading account interface 34 and to the market analysis software 26 along with the account equity and portfolio composition information which will be used to determine the correct number of shares buy or sell for entry into the next trade, as the entire cycle continues to repeat over and over again.

This process will continue until such time as the trader's research and/or changing objectives cause the trader to modify the Trading Plan. Once modified, the invention will once again provide the fully automated execution of the new Trading Plan, without trader attention or intervention.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An automated method of communicating trade orders to a marketplace for financial instruments through an on-line trading account with a financial institution, the method comprising the steps of:
    (a) receiving from a user trade trigger criteria for use by market analysis software, the market analysis software being configured to electrically receive market data, the trade trigger criteria being related to the market data;
    (b) accessing without further input from the user the market analysis software to analyze the market data and generate a trade decision in response to the trade trigger criteria being met by changes in the market data, the market data being independent of the trade decision; and
    (c) communicating automatically without further input from the user, through the use of a computer, a trade order based upon the trade decision from the on-line trading account.

2. The method of claim 1 wherein the market analysis software is hosted by an entity different than the financial institution.

3. The method of claim 1 wherein the on-line trading account is hosted at a web address accessible through a computer network.

4. The method of claim 1 wherein the market analysis software is hosted at a web address accessible through a computer network.

5. The method of claim 4 wherein step (b) includes communicating the trade trigger criteria to the market analysis software through a computer network.

6. The method of claim 1 wherein the market analysis software is hosted at a personal computer.

7. The method of claim 1 wherein the trade trigger criteria is based upon a status of the on-line trading account.

8. The method of claim 1 wherein step (b) further includes using the trade trigger criteria related to the market data with the market analysis software to generate a trade decision.

9. An automated system for communicating trade orders to a marketplace for financial instruments though an on-line trading account with a financial institution, the system comprising:
    a user interface configured to receive trade trigger criteria from a user;
    a market analysis software in electrical communication with the user interface for receiving the trade trigger criteria therefrom, the market analysis software being configured to receive market data, the trade trigger criteria being related to the market data, the market analysis software being further configured to analyze the market data and generate a trade decision in response to the trade trigger criteria being met by changes in the market data without further input from the user, the market data being independent of the trade decision; and
    a trading account interface in electrical communication with the market analysis software for receiving the trade decision therefrom, the trading account interface being configured to communicate automatically a trade order based upon the trade decision from the on-line trading account without further input from the user.

10. The system of claim 9 wherein the user interface is hosted at a web address accessible though a computer network.

11. The system of claim 9 wherein the market analysis software is hosted by an entity different than the financial institution.

12. The system of claim 9 wherein the market analysis software is hosted at a web address accessible through a computer network.

13. The system of claim 12 wherein the market analysis software is configured to receive the trade trigger criteria from the user interface through a computer network.

14. The system of claim 9 wherein the market analysis software is hosted at a personal computer.

15. The system of claim 9 wherein the trading account interface is configured to communicate with the market analysis software through a computer network.

16. The system of claim 9 wherein the market analysis software includes multiple market analysis software, each having a different analysis algorithm associated therewith.

17. The system of claim 9 wherein the trade trigger criteria is based upon a status of the on-line trading account.

18. An automated system for communicating trade orders to a marketplace for financial instruments though an on-line trading account with a financial institution, the system comprising:
- user interface configured to receive trade trigger criteria from a user;
- a market analysis software interface in electrical communication with the user interface for receiving the trade trigger criteria therefrom, the market analysis software interface being configured to communicate the trade trigger criteria to market analysis software, the market analysis software being configured to receive market data, the trade trigger criteria being related to the market data, the market analysis software being further configured to analyze market data and generate a trade decision in response to the trade trigger criteria being met by changes in the market data, the market data being independent of the trade decision without further input from the user, the market analysis software interface being configured to receive a trade decision from the market analysis software; and
- a trading account interface in electrical communication with the market analysis software interface for receiving a trade decision therefrom, the trading account interface being configured to communicate automatically a trade order based upon the trade decision from the on-line trading account without further input from the user.

19. The system of claim 18 wherein the user interface is hosted at a web address accessible through a computer network.

20. The system of claim 18 wherein the market analysis software is hosted by an entity different than the financial institution.

21. The system of claim 18 wherein the market analysis software interface and the market analysis software are hosted by different entities.

22. The system of claim 18 wherein the market analysis software is hosted at a web address accessible through a computer network.

23. The system of claim 18 wherein the market analysis software interface is configured to communicate with multiple market analysis software, each having a different analysis algorithm associated therewith.

24. The system of claim 18 wherein the market analysis software interface is configured to receive the trade trigger criteria from the user interface through a computer network.

25. The system of claim 18 wherein the trading account interface is configured to receive the trade decision from the market analysis software interface through a computer network.

26. The system of claim 18 wherein the trade trigger criteria is based upon a status of the on-line trading account.

* * * * *